US007328100B2

(12) United States Patent
Fukushima et al.

(10) Patent No.: US 7,328,100 B2
(45) Date of Patent: Feb. 5, 2008

(54) COIL FAILURE DETECTION SYSTEM FOR GENERAL-PURPOSE ENGINE

(75) Inventors: Tomoki Fukushima, Wako (JP); Yoshihisa Shinogi, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 19 days.

(21) Appl. No.: 11/477,553

(22) Filed: Jun. 30, 2006

(65) Prior Publication Data

US 2007/0012284 A1 Jan. 18, 2007

(30) Foreign Application Priority Data

Jul. 13, 2005 (JP) ............................ 2005-204865

(51) Int. Cl.
*G06F 19/00* (2006.01)
*F02D 1/00* (2006.01)

(52) U.S. Cl. ...................... 701/114; 123/333; 73/118.1; 324/380

(58) Field of Classification Search ................ 701/102, 701/114; 123/333, 335, 406.14, 653; 73/118.1; 324/378, 380, 388, 399
See application file for complete search history.

(56) References Cited

U.S. PATENT DOCUMENTS 4,239,024 A * 12/1980 Leichle .................. 123/406.14
4,250,450 A * 2/1981 Yamada et al. ............. 324/169
4,425,891 A * 1/1984 Kashimura et al. .... 123/406.16
4,848,304 A * 7/1989 Iwata ......................... 123/609
5,131,368 A * 7/1992 Komurasaki ........... 123/406.16
5,571,245 A * 11/1996 Ooyabu et al. ............. 123/630
6,920,783 B2 * 7/2005 Kesler ....................... 73/118.1

FOREIGN PATENT DOCUMENTS

JP 2005-076522 A 3/2005

* cited by examiner

*Primary Examiner*—John T. Kwon
(74) *Attorney, Agent, or Firm*—Westerman, Hattori, Daniels & Adrian, LLP.

(57) ABSTRACT

In a failure detection system of coils that produce outputs in response to rotation of a crankshaft of a general-purpose engine (including a power coil that produces an output indicative of the engine speed), the outputs produced by the coils are inputted to determine whether the coils produce the outputs, and it is discriminated that one of the coils (i.e., power coil) has failed when the coil does not produce the output, thereby enabling detection of failure such as wire breaking of the power coil and preventing overrunning of the engine and other such problems.

12 Claims, 4 Drawing Sheets

COIL FAILURE DETECTION SYSTEM FOR GENERAL-PURPOSE ENGINE

BACKGROUND OF THE INVENTION

1. Field of the Invention

This invention relates to a coil failure detection system for a general-purpose internal combustion engine.

2. Description of the Related Art

Japanese Laid-Open Patent Application No. 2005-76522 is one of a number of recently published references describing use of an actuator for regulating throttle opening in the type of general-purpose engine or industrial engine used as a prime mover in generators, agricultural machines and various other applications. The technique described in the reference calls for the provision of coils for generating outputs in response to rotation of the engine output shaft. One of the coils produces an output indicating engine speed and the throttle opening is regulated by controlling the operation of the actuator based on the output of this coil as one factor.

In the conventional arrangement, however, the engine is liable to experience a problem such as overrunning if the coil producing the output indicating engine speed breaks and fails, because in such case the engine speed cannot be detected so that throttle opening regulation becomes impossible. Detection of coil failure is therefore desirable for avoiding the occurrence of such problems.

SUMMARY OF THE INVENTION

An object of this invention is therefore to overcome the foregoing drawback by providing a coil failure detection system for a general-purpose engine that detects failure of a coil which generates an output in response to rotation of the engine output shaft.

In order to achieve the object, this invention provides a system for detecting failure of coils installed in a general-purpose engine and configured to produce outputs in response to rotation of an output shaft of the engine, comprising: a determiner configured to input the outputs produced by the coils and to determine whether the coils produce the outputs; and a discriminator configured to discriminate that one of the coils has failed when the one of the coils is determined not to produce the output.

BRIEF DESCRIPTION OF THE DRAWINGS

The above and other objects and advantages of the invention will be more apparent from the following description and drawings in which:

FIG. 4 is a time chart showing the output of the power coil in comparison with that of a pulser coil shown in FIG. 1; and.

DETAILED DESCRIPTION OF THE PREFERRED EMBODIMENT

A coil failure detection system for a general-purpose engine according to an embodiment of the present invention will now be explained with reference to the attached drawings.

Figure 1:
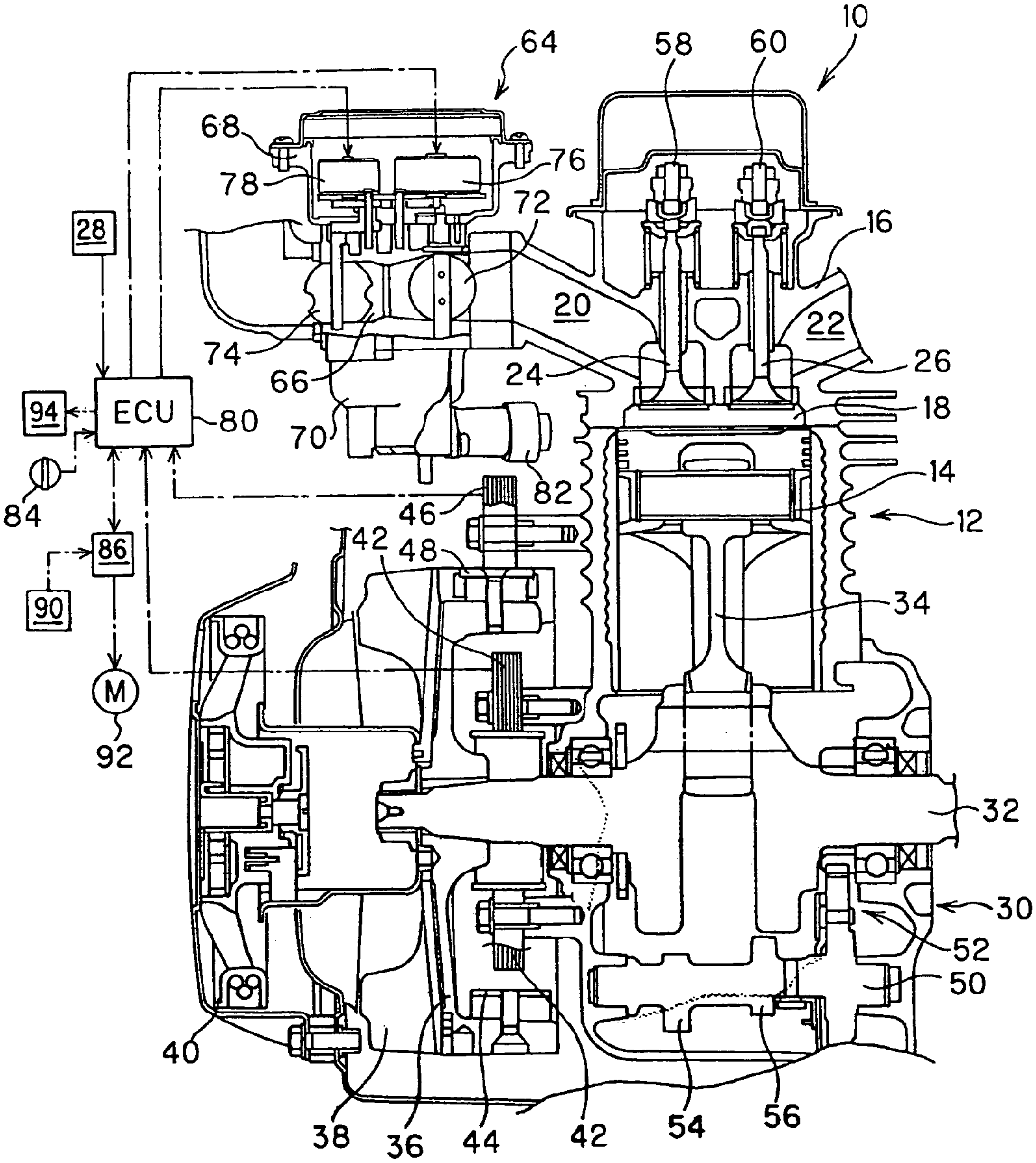
FIG. 1 is a diagram of an overall coil failure detection system for a general-purpose engine according to the preferred embodiment.

FIG. 1 is a diagram of the coil failure detection system for a general-purpose engine according to the preferred embodiment.

Reference numeral 10 in FIG. 1 designates a general-purpose or industrial engine. The engine 10 is an air-cooled, four-cycle, single-cylinder OHV model with a displacement of, for example, 400 cc. The engine 10 is suitable for use as the prime mover of a generator, agricultural machine or any of various other kinds of equipment.

The engine 10 has a cylinder (cylinder block) 12 accommodating a piston 14 that can reciprocate therein. A cylinder head 16 is attached to the top of the cylinder 12. A combustion chamber 18 is formed in the cylinder head 16 so as to face the crown of the piston 14. An intake port 20 and an exhaust port 22 are provided in communication with the combustion chamber 18. The cylinder head 16 is provided with an intake valve 24 for opening and closing communication between the combustion chamber 18 and the intake port 20, and an exhaust valve 26 for opening and closing communication between the combustion chamber 18 and the exhaust port 22. It is also provided with a temperature sensor 28 for producing an output indicating the temperature of the engine 10.

A crankcase 30 is attached to the bottom of the cylinder block 12. A crankshaft (output shaft) 32 is installed in the crankcase 30 to be rotatable therein. The crankshaft 32 is connected to the bottom of the piston 14 through a connecting rod 34.

A generator or other load (not shown) is connected to one end of the crankshaft 32. A flywheel 36, cooling fan 38 and recoil starter 40 are attached to the other end thereof. The recoil starter 40 starts the engine when manually manipulated or operated by the operator.

The flywheel 36 is shaped like a case and a power coil 42 is installed inside the case-like flywheel 36. The power coil 42 and a magnet 44 attached to the inner surface of the flywheel 36 together constitute a multi-polar generator that produces an output, i.e., alternating current synchronous with rotation of the crankshaft 32. The output indicates the engine speed NE and comprises alternating current in 3 Hz with one rotation of the crankshaft 32 and flywheel 36.

A pulser coil 46 is installed outside the flywheel 36. The pulser coil 46 produces an output indicating the ignition timing of the engine 10 every time a magnet 48 attached to the outer peripheral surface of the flywheel 36 passes by. Although omitted in FIG. 1, a coil for fuel-cut solenoid valve (FS coil) is installed inside the flywheel 36 together with the power coil 42. The FS coil also produces and output, i.e., alternating current synchronous with the rotation of the crankshaft 32.

A camshaft 50 is also installed in the crankcase 30 to be rotatable therein. The camshaft 50 is aligned in parallel with the axis of the crankshaft 32 and is connected to the crankshaft 32 through a gear mechanism 52. The camshaft 50 is equipped with an intake side cam 54 and an exhaust side cam 56, which operate through push rods (not shown) and rocker arms 58, 60 to open and close the intake valve 24 and exhaust valve 26.

A carburetor 64 is connected to the intake port 20. The carburetor 64 unitarily comprises an air intake passage 66, motor case 68 and carburetor assembly 70. A throttle valve 72 is installed in the air intake passage 66 and a choke valve 74 is also installed in the air intake passage 66 on the upstream side of the throttle valve 76. An electric throttle motor 76 for moving (opening and closing) the throttle valve 72 and an electric choke motor 78 for moving (opening and closing) the choke valve 74 are housed in the motor case 68. The throttle motor 76 and choke motor 78 are controlled their operation by an electronic control unit (ECU) 80 constituted as a microcomputer.

The carburetor assembly 70 is connected to a fuel tank to be supplied with fuel and jets fuel of an amount corresponding to the openings of the throttle valve 72 and choke valve 74, thereby producing an air-fuel mixture.

Reference numeral 82 in FIG. 1 designates the aforesaid fuel-cut solenoid valve. When the FS coil (shown in FIG. 2) of the fuel-cut solenoid valve 82 is energized, the valve member closes to block passage of fuel.

The air-fuel mixture produced in the carburetor 64 passes through the intake port 20 and intake valve 24 to be sucked into the combustion chamber 18. The air-fuel mixture sucked into the combustion chamber 18 is ignited by a spark plug (shown in FIG. 2) and burns. The resulting combustion gas is discharged to outside the engine 10 through the exhaust valve 26, the exhaust port 22, a muffler (not shown).

An engine speed setting switch 84 and a combination switch 86 are installed at locations to be operated by the operator. The engine speed setting switch 84 is responsive to operation by the operator for producing an output indicating the engine speed desired by the operator. The outputs of the temperature sensor 28, power coil 42, pulser coil 46 and engine speed setting switch 102 are sent to the ECU 80.

The engine 10 has a battery 90, a starter electric motor 92 and a LED (light emitting diode) 94. The battery 90 is connected to the ECU 80 and the starter motor 92 via the combination switch 86 and supplies 12V direct current to the ECU 80 and starter motor 92. The LED 94 is located at a position visible to the operator and is connected to the ECU 80.

Figure 2:
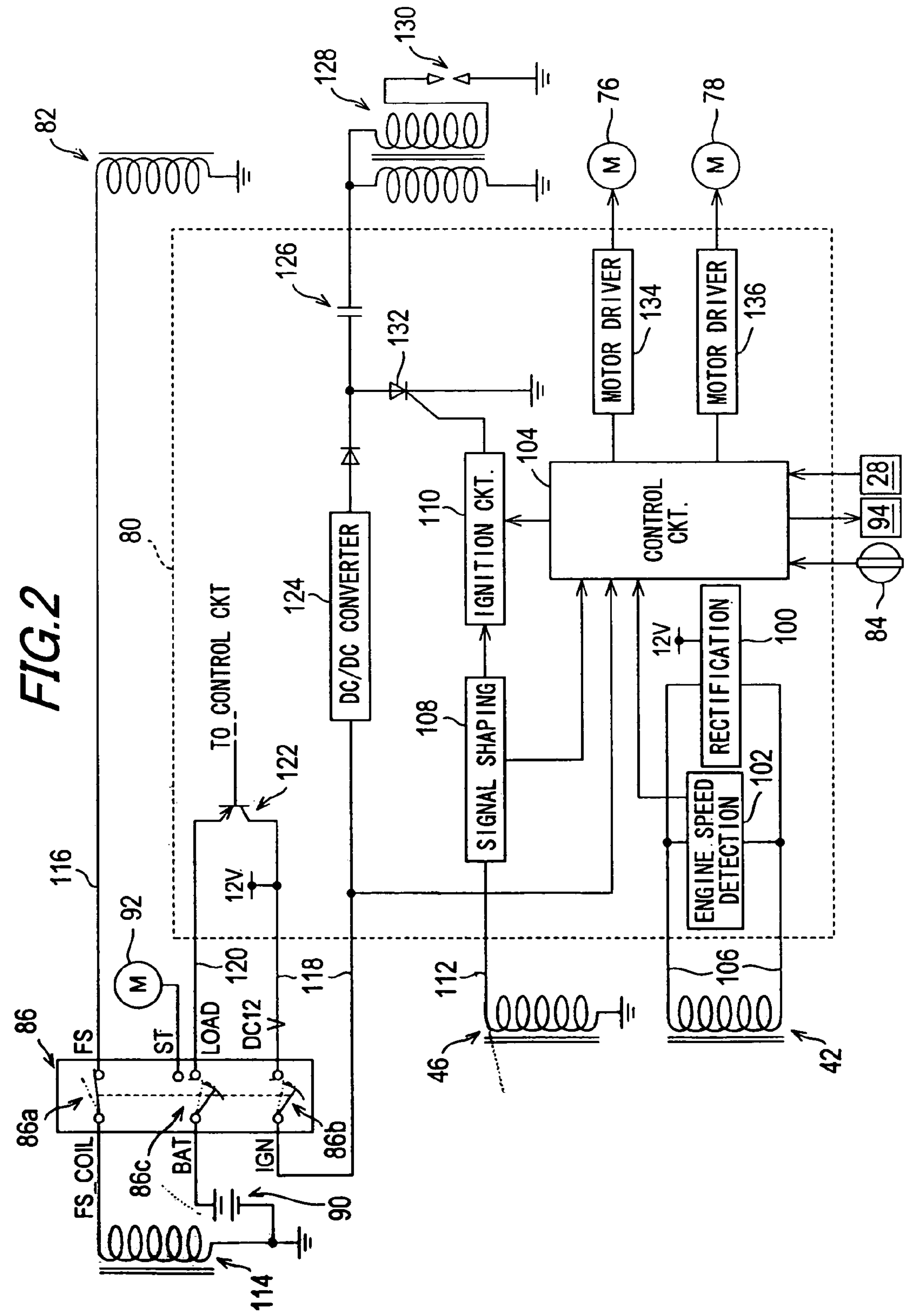
FIG. 2 is an explanatory diagram showing the configuration of an ECU and other components shown in FIG. 1.

FIG. 2 is an explanatory diagram showing the configuration of the ECU 80 and other components.

The ECU 80 is equipped with a rectification circuit 100, engine speed (NE) detection circuit 102, and control circuit 104. The output of the power coil 42 is forwarded through a conductor 106 to the rectification circuit 100 of the ECU 80, where it is converted to 12V direct current by full-wave rectification.

The output of the power coil 42 is sent to the engine speed detection circuit 102, where it is converted to a pulse signal. The pulse signal generated by the engine speed detection circuit 102 is inputted to the control circuit 104. The frequency of the alternating current generated by the power coil 42 is proportional to the rotating speed (rpm) of the crankshaft 32. The control circuit 114 can therefore use the pulse signal converted from the output of the power coil 42 to detect the engine speed (rpm). As mentioned above, since the output of the power coil 42 comprises the alternating current in 3 cycles (Hz) with one rotation of the crankshaft 32, the engine speed detection circuit 102 generates three pulse signals per one rotation of the crankshaft 32.

The ECU 80 is further equipped with a signal shaping circuit 108 and an ignition circuit 110. The output of the pulser coil 46 is sent through a conductor 112 to the signal shaping circuit 108, where it is used to generate an ignition signal (pulse signal) synchronous with the rotation of the crankshaft 32. The ignition signal generated by the signal shaping circuit 108 is sent to the ignition circuit 110 and control circuit 104. As mentioned above, since the pulser coil 46 produces one output every time the crankshaft 32 rotates, the signal shaping circuit 108 generates one pulse signal per one rotation of the crankshaft 32.

The combination switch 86 is equipped with a first switch 86*a*, a second switch 86*b* and a third switch 86*c*. The first switch 86*a* is disposed in a conductor 116 interconnecting the FS coil (now assigned with reference symbol 114) and a coil 82*a* of the fuel-cut solenoid valve 82 for enabling and disabling flow of current through the conductor 116. The second switch 86*b* is disposed in a conductor 118 for enabling and disabling flow of current through the conductor 118. The third switch 86*c* is disposed in a conductor 120 for enabling and disabling flow of current through the conductor 120. The battery 90 is connected, via a conductor 120, to the emitter terminal of a PNP transistor 122 disposed in the ECU 80. The base terminal of the transistor 122 is connected to the control circuit 104, while the collector terminal thereof is connected to the conductor 118.

The conductor 118 makes the 12V direct current supplied from the battery 90 or generated from the output of the power coil 42 passes out of the ECU 80 and then returns thereto through the second switch 86*b*. The current returning to the ECU 80 is applied to the control circuit 104 and a DC/DC converter 124. The 12V direct current supplied from the battery 90 or generated from the output of the power coil 42 is converted to 5V direct current in another circuit (not shown) and this 5V direct current is supplied to the control circuit 104 as operating current.

The DC/DC converter 124 steps up the voltage of the current supplied thereto to charge a capacitor 126 by the increased voltage. The capacitor 126 is connected to the primary coil of an ignition coil 128. The secondary coil of the ignition coil 128 is connected to the spark plug (now indicated as 130). The circuit connecting the DC/DC converter 124 to the capacitor 126 is grounded through a thyristor 132.

The ignition circuit 110 applies current to the gate of the thyristor 132 in accordance with an ignition signal inputted from the signal shaping circuit 118 or control circuit 114. The capacitor 126 therefore discharges through the primary coil of the ignition coil 128 and the resulting high voltage generated across the secondary coil causes the spark plug 130 to spark.

The temperature sensor 28 engine speed setting switch 84 and the LED 94 are connected to the control circuit 104. Based on the outputs of the temperature sensor 28, engine speed setting switch 84 and engine speed detection circuit 102, the control circuit 104 determines desired openings of the throttle valve 72 and choke valve 74 and outputs control signals corresponding thereto to the motor drivers 134 and 136, thereby controlling the operation of the throttle motor 76 and choke motor 78 so as to regulate the openings of the valves 72 and 74 and thus regulate the engine speed. Based on the signals, the control circuit 104 also regulates the ignition timing and other operations.

In addition, the control circuit 104 inputs the output of the power coil 42 (specifically the pulse signal generated therefrom and indicative of the engine speed) and the output of the pulser coil 46 (specifically the ignition signal (pulse signal) generated therefrom), and determines or detects the failure, more specifically braking (braking of wire) of the power coil 42 by determining whether the power coil 42 and pulser coil generates the outputs, as will be explained below.

The operator can set the combination switch 86 to the ON position or OFF position as desired. In FIG. 2, the solid lines indicate the state of the switches 86*a*, 86*b*, 86*c* when the combination switch 86 is in the OFF position and the imaginary lines indicate their state with it is in the ON position.

When the combination switch 86 is put in the ON position, the first switch 86*a* is turned OFF to cut off the supply of operating current to the fuel-cut solenoid valve 82. The fuel-cut solenoid valve 82 is normally open, so that cutting off the supply of operating current thereto enables jetting of fuel from the carburetor 64.

At the same time, the second switch 86*b* is turned ON to pass current through the conductor 118. The third switch 86*c* is also turned ON to pass current from the battery 90 to the emitter terminal of the transistor 122. With this, the 12V direct current is supplied from the battery 90 to the ignition system (comprising the DC/DC converter 124, capacitor 126, etc.) and to the control circuit 114, through the conductor 120, switch 86*c*, transistor 122, conductor 118 and switch 86*b*. The 5V direct current is supplied from the battery 90 to the control circuit 114 through the other circuit as the operating current.

When the combination switch 86 is turned to the start (ST) position beyond the ON position, the operating current is supplied from the battery 90 to the starter motor 92 through the third switch 86*c*, thereby operating the starter motor 92 to start the engine 10.

When the control circuit 104 detects from the engine speed or some similar parameters that the engine 10 has started, it turns off the transistor 122 to cut off the supply of operating current from the battery 90. With this, the supply source of the 12V direct current to the ignition system and control circuit 104 and that of the 5V direct current (operating current) are switched from the battery 90 to the power coil 42.

When the recoil starter 40 is manipulated with the combination switch 86 in the ON position, the resulting rotation of the crankshaft 32 causes the power coil 42 and pulser coil 46 to produce outputs. As a result, 12V direct current and an ignition signal are generated to activate the ECU 104 and start the engine 10. Thus, it becomes possible to start the engine 10 or to activate the ECU 80 and control circuit 104 by manipulating the recoil starter 40.

On the other hand, when the combination switch 86 is put in the OFF position, the second switch 86*b* is made off to cut off the supply of 12V direct current on the conductor 118. When the current supplied through the conductor 118 is cut off, the control circuit 140 terminates ignition and stop the engine 10. In addition, putting the combination switch 86 in the OFF position turns the first switch 86*a* ON to interconnect the FS coil 114 and the coil 82*a* of the fuel-cut solenoid valve 82.

The FS coil 114 continues to generate electricity even after ignition is terminated because rotation of the crankshaft 32 does not stop immediately. The fuel-cut solenoid valve coil 82*a* therefore continues to receive operating current from the FS coil 114 for a certain period of time after the combination switch 86 is put in the OFF position to open the fuel-cut solenoid valve 82. Ignition cutoff and fuel cutoff are consequently performed simultaneously.

Figure 3:
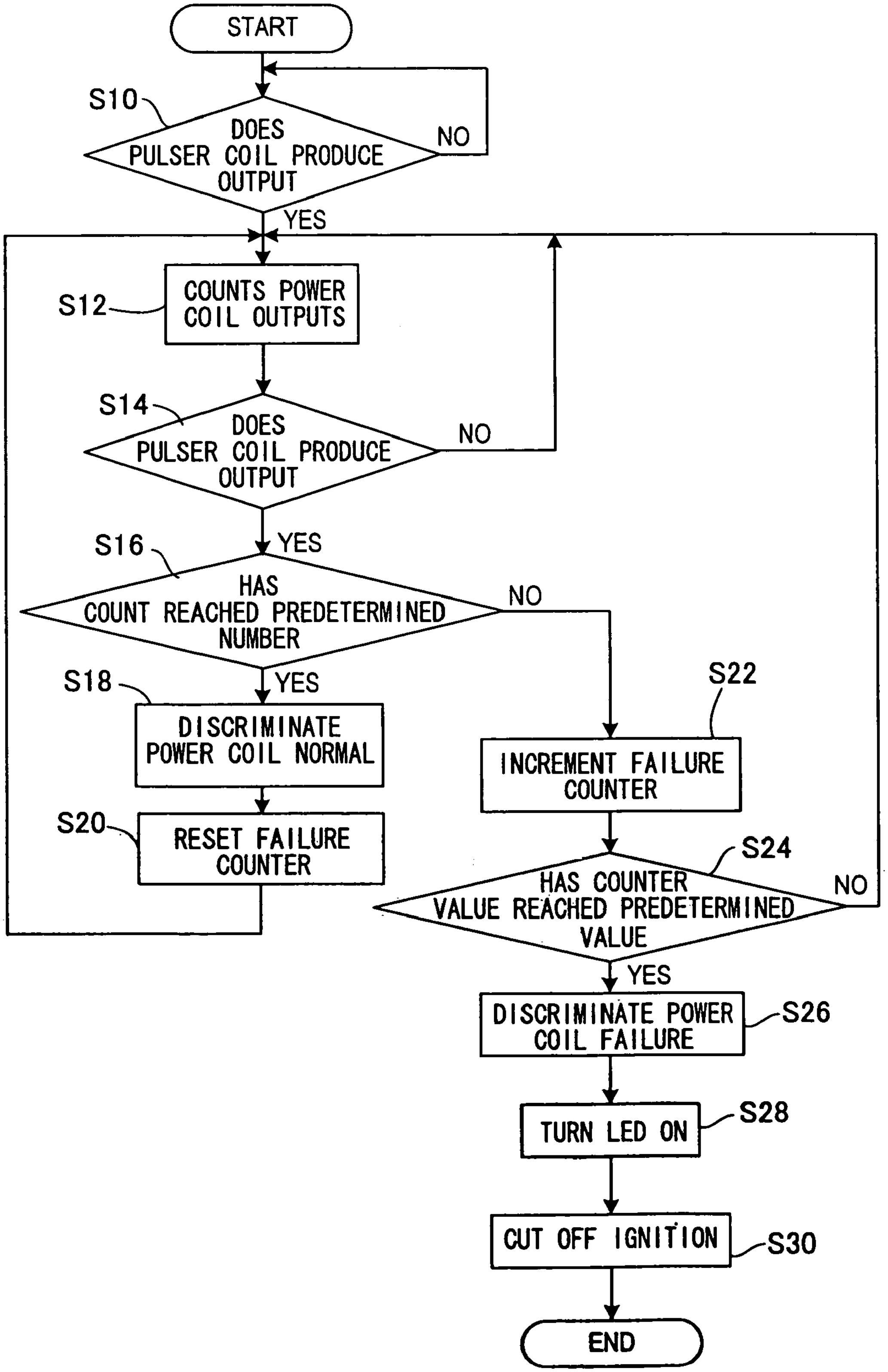
FIG. 3 is a flowchart showing the sequence of processing operations for detecting failure of a power coil shown in FIG. 1;.

The processing conducted in the control circuit 104 of the ECU 80 for detecting coil failure, more specifically breaking of the power coil 42 will now be explained. FIG. 3 is a flowchart showing the flow of this processing.

First, in S10, it is determined whether the pulser coil 46 produces an output, i.e., whether there is an input from the pulser coil 46. This is done in S10 by checking for the presence of the ignition signal, i.e., the pulse signal generated from the output of the pulser coil 46, i.e., the presence of the pulse signal outputted from the signal shaping circuit 108. When the result in S10 is NO, the processing of S10 is repeated.

When it is YES, the program goes to S12, in which counting of the outputs of the power coil 42 is initiated. The outputs of the power coil 42 to be counted is actually the pulse signals generated from the outputs of the power coil 42, i.e., the pulse signals outputted from the engine speed detection circuit 102.

Next, in S14, similarly to in S10, it is determined whether the pulser coil 46 produces the output (whether the pulser coil 46 produces next output). When the result in S14 is NO, the program returns to S12 to continue counting of the outputs of the power coil 42.

When it is YES, the program goes to S16, in which it is determined whether the counted number of the outputs of the power coil 42 has reached a predetermined number (i.e., 3).

Figure 4:
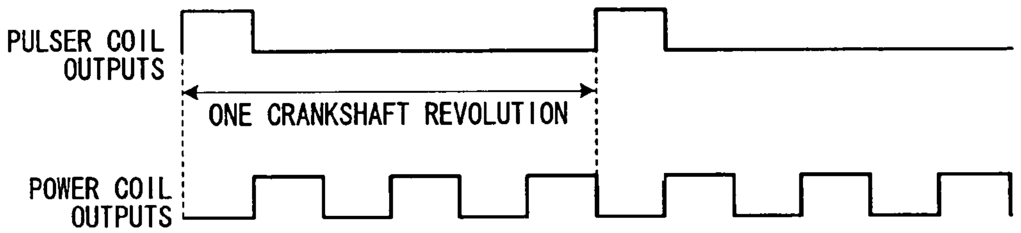
Figure 5:
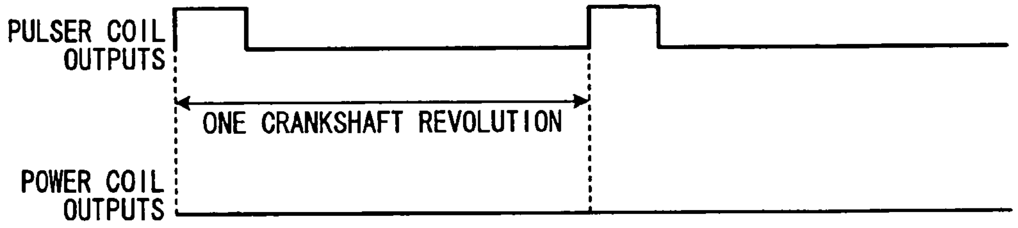
FIG. 5 is a time chart also showing the output of the power coil in comparison with that of the pulser coil.

FIGS. 4 and 5 are time charts showing the output of the power coil 42 and the output of the pulser coil 46.

As shown in FIG. 4, insofar as the power coil 42 and pulser coil 46 have not both broken, the power coil 42 produces three outputs between successive outputs from the pulser coil 46 (i.e., during one revolution of the crankshaft 32). In this case, the result in S16 of the flowchart of FIG. 3 is YES and the program goes to S18, in which the power coil 42 is discriminated to be normal, to S20, in which the value of a failure counter (explained later) is reset, and then returns to S12.

As shown in FIG. 5, when the power coil 42 has failed, there is no output from the power coil 42. So when the result in S16 of the flowchart of FIG. 3 is NO (when the power coil 42 produces no output), the power coil 42 is discriminated to be abnormal and the program goes to S22, in which the value of the power coil 42 failure counter (initially 0) is incremented by 1.

Next, in S24, it is determined whether the value of the failure counter has reached a predetermined value (10), i.e., whether abnormality of the power coil 42 has consecutively be discriminated a predetermined number of times (e.g., 10 times). When the result in S24 is NO, the program returns to S12. When it is YES, the program goes to S26, in which it is discriminated that abnormalities like wire breaking or the like occurred and the power coil 42 has failed.

In other words, when the power coil 42 does not produce even a single output during a period when the pulser coil 46 produced a predetermined number of outputs, the power coil 42 is discriminated to have failed. The reason for discriminating failure of the power coil 42 only when a predetermined number of "abnormal" discriminations has been made consecutively is to avoid false failure detection caused by deviation in the output timing of the coils that arises when the crankshaft 32 rotates backward (reverse rotation caused by insufficient compression occurring at starting and stopping of the engine 10).

When the power coil 42 produces no output, i.e., when failure of the power coil 42 is detected, an operation for informing the operator and an operation for stopping the engine 10 are implemented.

Specifically, the LED 94 is turned on (more exactly, is blinked a predetermined number of times (e.g., 6 times)) in S28 to inform the operator that the power coil 42 has failed and ignition is cut off in S30 (an ignition cutoff signal is sent to the ignition circuit 110) to stop the engine 10.

As set out above, the foregoing embodiment of the invention provides a system for detecting failure of (two) coils (power coil 42, pulser coil 46) installed in a general-purpose engine and configured to produce outputs in response to rotation of an output shaft (crankshaft 32) of the engine (10), comprising a determiner (ECU 80, control circuit 104, S14 and S16 of the flowchart of FIG. 3) configured to input the outputs produced by the coils and to determine whether the coils produce the outputs, and a discriminator (ECU 80, control circuit 104, and S26 of the flowchart of FIG. 3) configured to discriminate that one of the coils (power coil 42) has failed when the one of the coils is determined not to produce the output, thereby enabling detection of failure such as wire breaking of the power coil 42 and preventing overrunning of the engine 10 and other such problems.

In addition, the coils include a coil configured to produce an output indicative of the engine speed (power coil 42). As a result, occurrence of engine overrunning and other such problems can be prevented.

Further, it further includes an operation implementer (ECU 80, control circuit 104, and S28 and S30 of the flowchart of FIG. 3) configured to implement at least one of an operation for stopping the engine and an operation for informing the operator when the one of the coils is determined to have failed. As a result, occurrence of engine overrunning and other such problems can be still more effectively prevented.

More specifically, the embodiment provides a system for detecting failure of coils installed in a general-purpose engine and including a first coil (power coil 42) configured to produces an output indicating engine speed in response to rotation of an output shaft (crankshaft 32) of the engine (10) and a second coil (pulser coil 46) configured to produce an output indicating an ignition timing of the engine in response to rotation of the output shaft, comprising a determiner (ECU 80, control circuit 104, and S14 and S16 of the flowchart of FIG. 3) configured to input the outputs produced by the first coil and the second coil and to determine whether the first coil and the second coil produce the outputs, and a discriminator (ECU 80, control circuit 104, and S26 of the flowchart of FIG. 3) configured to discriminate that the first coil has failed when it is determined that the second coil produces the output, while the first coil does not produce the output. As a result, failure of the first coil for producing an output indicating the engine speed can be detected, thereby preventing overrunning of the engine and other such problems.

Furthermore, the discriminator (ECU 80, control circuit 104, and S24 and S26 of the flowchart of FIG. 3) is configured to discriminate that the first coil has failed when the first coil does not produce the output during a period in which the second coil produces a predetermined number of the outputs. As a result, failure of the first coil can be detected with high accuracy.

In addition, it further includes an operation implementer (ECU 80, control circuit 104, and S28 and S30 of the flowchart of FIG. 3) configured to implement at least one of an operation for stopping the engine and an operation for informing the operator when the first coil is determined to have failed. As a result, occurrence of engine overrunning and other such problems can be still more effectively prevented.

It should be noted in the above that, the reason for not detecting failure of the pulser coil 46 is that failure of the pulser coil 46 stops generation of the ignition signal, thus stopping the engine 10 and eliminating any possibility of overrunning or other such problems.

Nevertheless, it should be noted that, although the foregoing explanation relates to detecting failure of the power coil 42, failure of the pulser coil 46 can detected by a similar technique if desired. It is also possible to send the output of the FS coil 114 to the control circuit 104 and detect failure of the FS coil.

It should further be noted that, although the foregoing embodiment is configured to respond to a determination that the power coil 42 has failed by carrying out an operation for informing the operator and an operation for stopping the engine 10, it is instead possible to adopt a configuration that performs only one of these operations.

It should still further be noted that, although it is explained that the operator is informed of failure of the power coil 42 by turning on the LED 94, the operator can instead be informed by another type of display device or by voice.

Japanese Patent Application No. 2005-204865 filed on Jul. 13, 2005, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detecting failure of coils installed in a general-purpose engine and configured to produce outputs in response to rotation of an output shaft of the engine, comprising:

a determiner configured to input the outputs produced by the coils and to determine whether the coils produce the outputs; and a discriminator configured to discriminate that one of the coils has failed when the one of the coils is determined not to produce the output.

2. The system according to claim 1, wherein the coils include a coil configured to produce an output indicative of the engine speed.

3. The system according to claim 1, further including:

an operation implementer configured to implement at least one of an operation for stopping the engine and an operation for informing the operator when the one of the coils is determined to have failed.

4. A system for detecting failure of coils installed in a general-purpose engine and including a first coil configured to produces an output indicating engine speed in response to rotation of an output shaft of the engine and a second coil configured to produce an output indicating an ignition timing of the engine in response to rotation of the output shaft, comprising:

a determiner configured to input the outputs produced by the first coil and the second coil and to determine whether the first coil and the second coil produce the outputs; and a discriminator configured to discriminate that the first coil has failed when it is determined that the second coil produces the output, while the first coil does not produce the output.

5. The system according to claim 4, wherein the discriminator discriminates that the first coil has failed when the first coil does not produce the output during a period in which the second coil produces a predetermined number of the outputs.

6. The system according to claim 4, further including:

an operation implementer configured to implement at least one of an operation for stopping the engine and an operation for informing the operator when the first coil is determined to have failed.

7. A method of detecting failure of coils installed in a general-purpose engine and configured to produce outputs in response to rotation of an output shaft of the engine, comprising the steps of:

inputting the outputs produced by the coils and determining whether the coils produce the outputs; and discriminating that one of the coils has failed when the one of the coils is determined not to produce the output.

8. The method according to claim 7, wherein the coils include a coil configured to produce an output indicative of the engine speed.

9. The method according to claim 7, further including the step of implementing least one of an operation for stopping the engine and an operation for informing the operator when the one of the coils is determined to have failed.

10. A method of detecting failure of coils installed in a general-purpose engine and including a first coil configured to produces an output indicating engine speed in response to rotation of an output shaft of the engine and a second coil configured to produce an output indicating an ignition timing of the engine in response to rotation of the output shaft, comprising the steps of:

inputting the outputs produced by the first coil and the second coil and determining whether the first coil and the second coil produce the outputs; and discriminating that the first coil has failed when it is determined that the second coil produces the output, while the first coil does not produce the output.

11. The method according to claim 10, wherein the step of discriminating discriminates that the first coil has failed when the first coil does not produce the output during a period in which the second coil produces a predetermined number of the outputs.

12. The method according to claim 11, further including the step of:

implementing at least one of an operation for stopping the engine and an operation for informing the operator when the first coil is determined to have failed.

* * * * *

UNITED STATES PATENT AND TRADEMARK OFFICE

CERTIFICATE OF CORRECTION

PATENT NO. : 7,328,100 B2 
APPLICATION NO. : 11/477553
DATED : February 5, 2008
INVENTOR(S) : Tomoki Fukushima et al.

It is certified that error appears in the above-identified patent and that said Letters Patent is hereby corrected as shown below:

In Column 8:

Claim 4, Line 45, change “produces” to --produce--.

In Column 9:

Claim 9, Line 14, change “least” to --at least--.

In Column 9:

Claim 10, Line 19, change “produces” to --produce--.

Signed and Sealed this

Twelfth Day of August, 2008

JON W. DUDAS
*Director of the United States Patent and Trademark Office*